Jan. 12, 1932. H. H. GEFFCKEN ET AL 1,840,500
METHOD AND SYSTEM FOR DETERMINING AND MEASURING LIGHT AND COLOR DIFFERENCES
Filed June 14, 1929
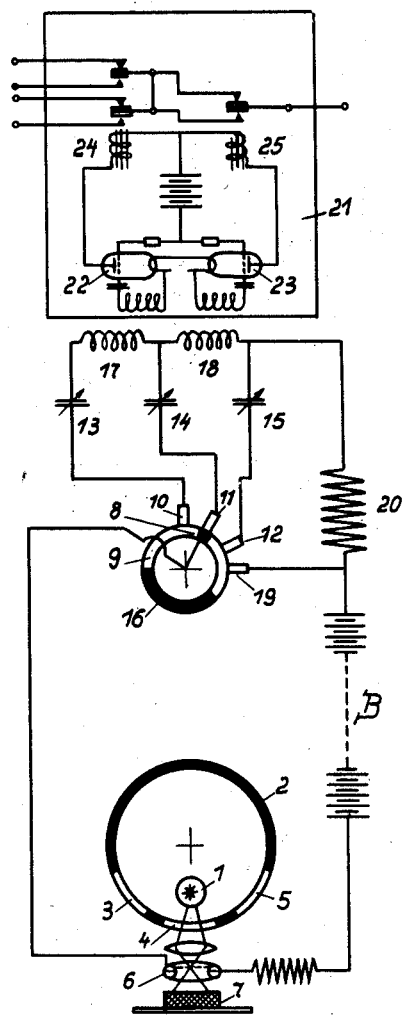
Inventors:
Heinrich H. Geffcken
Hans R. Richter
By Brown, Jackson, Boettcher / Dienner
Attys.

Patented Jan. 12, 1932

1,840,500

UNITED STATES PATENT OFFICE

HEINRICH H. GEFFCKEN AND HANS R. RICHTER, OF LEIPZIG, GERMANY

METHOD AND SYSTEM FOR DETERMINING AND MEASURING LIGHT AND COLOR DIFFERENCES

Application filed June 14, 1929, Serial No. 371,030, and in Germany December 12, 1927.

This invention relates, generally speaking, to a method for determining and measuring light and color differences, and is particularly concerned with such a method and apparatus using light sensitive electric organs, e. g., photo cells, especially for the purpose of sorting.

As is known, light and color differences may be objectively measured by means of light sensitive electric organs, e. g., photo cells, selenium cells, thermo couples, etc., and they may also be used for switching of various kinds. These facts are of especial importance in connection with automatic sorting, and they have, therefore, been variously employed for finding a suitable solution for the problems arising therewith. However, the difficulty occurred that mechanical switching could not be accomplished with any degree of operation safety and certainty, on account of the relatively weak currents furnished by the usual light sensitive electric organ. The fact that the sensitivity of most of the light sensitive electric organs changes within a certain time, was felt particularly troublesome.

The present method is concerned with methods and means, which permit to determine and to measure, with great operation safety, light and color differences, respectively by means of light sensitive electric organs and particularly of photo cells, and to utilize them for various switching purposes.

In accordance with the invention, the novel method is characterized thereby that two or more condensers are one after another for a given time connected to the same light sensitive electric organ, receiving from its action a change of their charge, while said organ is correspondingly under the influence of a different one of several light or color shades, which have to be compared with each other. A further principle characteristic of the invention resides therein, that the mentioned condensers are connected in parallel at the termination of the operation, thereby causing actuation of switching equipment, including indicator apparatus, by means of the mutual discharge impulse in one direction or the other. The significant advantage of this procedure lies in the fact that the measuring of the intensity relations of the various lights or colors to be compared, may be derived from a comparison of the charge conditions of the condensers, and in the further fact that this charge condition is manifested in form of the created equalizing currents at the subsequent parallel connection of the condensers.

The electric current which flows thru a light sensitive electric organ, e. g., a photo cell, depends, other influences neglected, in first place, on the lighting of the organ. This lighting may differ according to strength and according to color. Since the light sensitive electric organ exhibits different sensitivity for the different colors (which, however, does not agree with the human eye) a brightness comparison may only be accomplished under the assumption of equal color, and a color comparison under consideration of the varying sensitivity. The fact that the method according to the present invention considers all these factors in a simple fashion, may be recorded as a further asset and additional advantage.

The invention will now be described more in detail.

The change of the load of a condenser may be accomplished either by charging or by discharging. The conditions are easiest explained and controlled during charging. The invention will, therefore, be explained particularly with reference to such examples. As is known, a condenser, which is charged with a certain constant current for a certain time, reaches a charge tension in proportion to its size, e. g., the tension will be the higher, the smaller the condenser. This property is, according to the invention, utilized for defining a certain intensity relation of the light shades or colors, respectively, under observation. If, for example, a current $I_1$ is created in the light sensitive electric organ by a certain light and at a certain brightness relation, and a current $I_2$ by another brightness and if the corresponding condensers are calibrated so that the formula $$C_1 : C_2 = I_1 : I_2,$$

the two condensers will be at the same tension after the same charging period and no equalizing current impulse will occur upon their parallel connection. If, however, one or the other light shade predominates, so that the assumptions of the above formula are broken, an equalizing current impulse will occur upon the parallel connection of the condensers, which will be in one or the other direction, and the deviation from the predetermined light shade will become manifest. The above formula is, in this simple form, only valid when the charge current is independent of the tension already reached, e. g., at the use of vacuum photo cells for a light sensitive electric organ. In case of other kinds of light sensitive electric organs, the volume of energy which flows thru the organ within the time of measurement will take the place of the current (I).

Equal charge tensions at predetermined intensity distribution could be reached by corresponding adjustment of the relation of the charge time, in the place of adjusting condensers of varying capacity. However, this is, from the technical standpoint, less desirable.

It will easily be seen that small light differences, or color differences, respectively, cause more pronounced effects by using the present invention, than by immediate measurement of the current, because the time results as a factor and the amount of current, which flows thru the light sensitive electric organ is first stored in the condensers. A further principal advantage of the method herein described consists in the fact that alterations of sensitivity of the light sensitive electric organ are practically negligible, because, in the first place, there is only one such organ employed, and the various lights and colors act upon the same one after another, and secondly because the absolute tension value to which the condensers are charged, is entirely unimportant. Important is only the difference of the charge tensions which arrive at the condensers during the time light is being thrown at the light sensitive electric organ. This difference can become zero only in case the amounts of current which flow thru the light sensitive electric organ are in the same relation to each other as the capacities of the condensers.

An especial problem, which is also solved by the invention, and which has particular importance for automatic sorting, resides in the examining of indifferent or mixed colors. The character of such a color is determined by the number of pure spectral colors contained therein, and, above all, by the intensity relation of these colors to each other. As is known, certain components of the indifferent color under observation, may be directed upon the light sensitive electric organ, by interposing filters between this organ and the color. Therefore, instead of testing several individual lights or colors, as was explained in previous paragraphs, one may also examine an indifferent color as to the intensity relation of its individual spectral components, by successively interposing several filters between the object and the light sensitive electric organ, and by influencing in the main order the charge of some condensers the number of which is in accordance to the filters used. The relation of the tensions to which the condensers of the same size are charged at corresponding time intervals, corresponds then to the effects played upon the light sensitive electric organ by the individual spectral components which are defined by the filters. The equalizing current impulses between the single condensers when connected in a parallel, will not occur in case of correspondence of the predetermined indifferent color, provided the condensers are calibrated (empirically) in accordance to the various spectral light sensitiveness of the cell and upon a definite intensity relation of the individual color components, of the indifferent color to be tested.

The invention will now be explained in detail, with reference to the single sheet of drawing, which shows, in the usual schematic manner, an example of applying it to practical use. Specifically stated, the example illustrates an arrangement for testing an object for the intensity relation of the spectral components of its indifferent color, and the purpose of this test is assumed to be sorting of such objects.

Referring now to the drawing, the light source 1 is arranged within a rotatable drum 2, which carries various filters at 3, 4 and 5. The lamp 1 throws its light thru the corresponding filter over a collecting lens, and thru a well known circular photo cell 6 upon the body 7 which is under observation. The light reflected from the latter arrives at the photo cell 6 and causes therein an electric current under the influence of the battery B. The cathode of the photo cell 6 is connected with the segment 8 of the circular switch 9. The brushes 10, 11 and 12 which are adapted to brush over the switch 9, are connected with condensers 13, 14 and 15. The contact switch 9 is, by means of a suitable drive, moved synchronously and phaselike with the filter drum 2, so that the condenser 13 is charged when the filter 3 faces the light source 1. Therefore, the observation takes place within a spectral range defined by the filter 3. The condenser 14 will likewise be charged under the influence of the filter 4 and the condenser 15 under the influence of the filter 5. Since the condensers 13 and 15 are variable, the capacity of the three condensers may be brought into such relation to each other, that they reach the same charge tension at a predetermined spectral distribution of the reflection capability of the observed body 7.

Upon further rotation of the switch 9, the contact segment 16 will come in touch with the brushes 10, 11 and 12, and will first connect the brushes 10 and 11, and then the brushes 11 and 12 with each other. There will be no equalizing current impulse only in case the condensers 13, 14 and 15 are equally charged. However, if the load of the condensers differs, there will be, according to the arrangement chosen, an oscillatory or a nonoscillatory equalizing current impulse in one direction or in the other direction. This impulse may be drawn from the coils 17 and 18, respectively, and may be used for actuating certain equipment. Upon further rotation of the contact ring 9, the brushes 10 to 12, inclusive, will become connected with the brush 19, which causes a discharge of the condensers 13 to 15, inclusive. The choke resistance 20 is provided in order to avoid—when this takes place—an induced impulse in the coils 17 and 18 which might cause false actuation of the indicating equipment.

The utilization of the equalizing impulse in the coils 17 and 18, for mechanical and electrical switching, may be accomplished in various ways. In the drawing an especial adapted aggregate 21 has been shown, which includes two electron tubes 22 and 23, whose grids are blocked, each by a condenser, and influenced by the current impulses occurring in coils 17 and 18. In such a circuit, exceedingly weak impulses are sufficient for choking the anode current of a tube almost completely for a certain time. There are relays 24 and 25 provided in the anode circuit of the tubes 22 and 23, and it will be seen, that four different paths may be taken, depending on whether none of the tubes or one of them or both are blocked. With reference to the invention, this means that an indication or sorting may take place according to four different conditions, e. g., either perfect agreement with the predetermined value of spectral distribution of the reflection capability, or predominance of the first, the second, or the third spectral component defined by the filters 3, 4 or 5. The sorting itself may be accomplished by means of suitable apparatus, controlled by the relays 24 and 25.

What is claimed is:

1. A system for determining and measuring light and color differences of a plurality of objects, including a light sensitive electric organ, a plurality of condensers, means for successively directing light rays upon said organ varying in accordance with color differences of said objects, means for subjecting said condensers successively to the influence of said organ in synchronism with said varying rays, means for then connecting said condensers in a parallel circuit, and means for utilizing equalizing current impulses occurring between said condensers for indicating and measuring purposes.

2. A system for determining and measuring light and color differences of a plurality of objects, including a light sensitive electric organ, a plurality of condensers, means for successively directing light rays upon said organ varying in accordance with the brightness of said objects, means for subjecting said condensers successively to the influence of said organ in synchronism with the succession of said light rays whereby the charge of said condensers is changed according to the brightness or color degrees of said objects, means for then connecting said condensers in a parallel circuit, and means for then utilizing equalizing currents occurring between said condensers for indicating and measuring purposes.

3. A system for determining and measuring light and color differences of a plurality of objects, including a light sensitive electric organ, a plurality of condensers, means for directing rays upon said organ varying in accordance with the brightness of said objects, means for subjecting said condensers successively and for a certain time to the influence of said organ whereby the charge of said condensers is changed according to the light and color variations of said objects, means for then connecting said condensers in a parallel circuit, and means for then utilizing equalizing current impulses occurring between said condensers for indicating and measuring purposes.

4. A system for determining and measuring indifferent or mixed colors according to the intensity and volume of their spectral components, comprising a light sensitive electric organ, a plurality of condensers, a plurality of different light filters, means for moving two or more of said filters successively within the light path of said light sensitive electric organ, means for connecting said condensers in synchronism with the succession of said filters to said light sensitive electric organ, and means for then testing the relations of the charges of said condensers.

5. A system for determining and measuring indifferent or mixed colors according to the intensity and volume of their spectral components, having a light sensitive electric organ, a plurality of condensers, a plurality of different light filters, means for moving said filters successively within the light path of said organ and for connecting said condensers successively to the circuit thereof in synchronism with the succession of said filters, whereby the charge of said condensers is changed according to the light intensities within the spectral range determined by said filters, and automatic means for then testing the charge relations of said condensers.

6. A system for determining and measuring light and color differences of a plurality of objects, including a light sensitive electric organ, a plurality of condensers, a plurality of different light filters, a source of light for irradiating said objects, automatic means for moving said filters successively within the path of said light source, means for successively connecting said condensers to the circuit of said organ in synchronism with the succession of said filters and during an equal period of time each whereby the charge of said condensers is changed according to the light intensities within the spectral ranges determined by said filters, and means for then utilizing the charge relations of said condensers, for indicating and measuring purposes.

7. A system for determining and measuring indifferent or mixed colors of objects according to the intensity and volume of their spectral components, including a source of light for irradiating said objects, a plurality of different light filters, means for successively interposing said filters between said source and said objects, a light sensitive electric organ for receiving the rays reflected from said objects, a plurality of condensers, means for successively connecting said condensers for an equal period each to the circuit of said light sensitive electric organ in synchronism with the succession of said light filters, the capacities of said condensers being calibrated to each other so that they receive the same charge depending on a predetermined spectral color intensity relation of the objects, indicating and switching apparatus, and means for utilizing the charge difference of said condensers for measuring and indicating purposes.

8. The method of color comparison of a plurality of objects having different optical properties, consisting of subjecting said objects to a series of optical observations for an equal period of time each, of electrically storing said observations, and utilizing the difference of stored energy of said observations for comparing said objects.

9. The method of determining and measuring light and color differences of objects, consisting of subjecting said objects to a series of electro-optical observations, of simultaneously translating and storing said observations into electrical charges of discharging the stored energy and utilizing the difference of the discharge currents for determining and measuring purposes.

10. Means for comparing the intensity of light rays, comprising a photoelectric organ, means for subjecting said organ in succession to said light rays, a plurality of condensers, means for charging said condensers by said electric organ in accordance with the action of one of said light rays each, and further means for utilizing the difference of charge of said condensers for comparison of the intensity of said light rays.

11. Means for comparing the color grading of a plurality of objects, comprising means to subject said objects to a succession of electro optical tests as to certain predetermined spectral ranges for an equal period of time each, a plurality of condensers, means for charging said condensers each in accordance with one of said electro optical tests, and further means for utilizing the difference of charge of said condensers for comparing the spectral components of the color grading of said objects.

12. Means for comparing the color grading of a plurality of objects, comprising means to subject said objects to a succession of electro optical tests as to predetermined visual spectrum ranges, a plurality of condensers, means for charging said condensers during an equal period of time each in accordance with one of said tests each and in synchronism with the succession of said electro optical tests, and further means for then connecting said condensers in a parallel circuit and utilizing the difference of discharge currents of said condensers for comparing the spectral components of the color grading of said objects.

In testimony whereof we affix our signatures.

HEINRICH H. GEFFCKEN.
HANS R. RICHTER.